United States Patent
Ben-Yair et al.

(10) Patent No.: US 9,886,584 B2
(45) Date of Patent: Feb. 6, 2018

(54) OPTIMIZED REDACTION SYSTEM

(71) Applicant: International Business Machines Corporation, Armonk, NY (US)

(72) Inventors: Yoav Ben-Yair, Mevasseret Zion (IL); Gil Fuchs, Mevasseret Zion (IL); Itai Gordon, Jerusalem (IL); Ilan D. Prager, Beit Shemesh (IL)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 15/053,555

(22) Filed: Feb. 25, 2016

(65) Prior Publication Data

US 2017/0249466 A1   Aug. 31, 2017

(51) Int. Cl.
G06F 21/60 (2013.01)
G06F 3/01 (2006.01)
G06K 9/00 (2006.01)

(52) U.S. Cl.
CPC .............. *G06F 21/60* (2013.01); *G06F 3/013* (2013.01); *G06K 9/00302* (2013.01); *G06K 9/00885* (2013.01); *G06K 2009/00939* (2013.01)

(58) Field of Classification Search
CPC .... G06F 21/60; G06F 2221/0748; H04N 1/44
See application file for complete search history.

(56) References Cited

U.S. PATENT DOCUMENTS

| | | | |
|---|---|---|---|
| 7,523,316 B2 | 4/2009 | Cheng et al. | |
| 8,584,005 B1 * | 11/2013 | Pittenger | G06F 17/24 715/230 |
| 8,717,393 B2 | 5/2014 | Pasquero et al. | |
| 8,935,807 B2 | 1/2015 | Sinha et al. | |
| 9,047,472 B2 | 6/2015 | Riordan et al. | |
| 2007/0201731 A1 * | 8/2007 | Fedorovskaya | G06F 17/30265 382/118 |
| 2011/0239113 A1 * | 9/2011 | Hung | G06F 19/322 715/271 |
| 2013/0145304 A1 | 6/2013 | Deluca et al. | |
| 2013/0235073 A1 | 9/2013 | Jaramillo et al. | |

OTHER PUBLICATIONS

Wei et al., "Sensing Learner Interest Through Eye Tracking," Ninth IT & T Conference, Dublin Institute of Technology, Dublin, Ireland, Oct. 22-23, 2009, 8 pgs.

* cited by examiner

*Primary Examiner* — Izunna Okeke
(74) *Attorney, Agent, or Firm* — Erik K. Johnson

(57) ABSTRACT

An embodiment of the invention may include a method, computer program product and system for redacting a document. The embodiment may include receiving an unredacted document. The embodiment may include determining portions of the unredacted document containing sensitive information. The embodiment may include applying a redaction method to the portions containing sensitive information to create a redacted document. The redaction method replaces the portion containing sensitive information with a different piece of content. The different piece of content correlates to a most stringent redaction method. The embodiment may include displaying the redacted document to a user. The embodiment may include determining the user is frustrated, and replacing the piece of content with a piece of content corresponding to a next most stringent redaction method from the list of redaction methods. The embodiment may include displaying the updated redacted document to the user.

14 Claims, 3 Drawing Sheets

OPTIMIZED REDACTION SYSTEM

BACKGROUND

The present invention relates to redaction techniques, and more particularly to the use of a user's frustration in determining levels of redaction.

Redaction is used to prevent the inadvertent disclosure of privileged or otherwise confidential or sensitive information. Redaction is the removal, or obscuring, of original text and images from documents to hide sensitive content. Such sensitive information may be based on privacy laws (e.g. HIPAA, attorney client privilege) or be used in a manner to restrict the dissemination of identifying information beyond the people who need to access such information to perform their jobs.

BRIEF SUMMARY

An embodiment of the invention may include a method, computer program product and system for redacting a document. The embodiment may include receiving an unredacted document. The embodiment may include determining one or more portions of the unredacted document contains sensitive information. The embodiment may include applying a redaction method to the one or more portions of the unredacted document containing sensitive information to create a redacted document. The redaction method replaces the one or more portions of the unredacted document containing sensitive information with one or more different pieces of content. The one or more different pieces of content correlate to a most stringent redaction method selected from a list of redaction methods. The embodiment may include displaying the redacted document to a user. The embodiment may include determining a frustration level of the user. The embodiment may include replacing at least one of the one or more different pieces of content with a one or more pieces of content corresponding to a next most stringent redaction method from the list of redaction methods based on determining that the frustration level of the user is above a threshold value. The embodiment may include displaying the updated redacted document to the user.

DETAILED DESCRIPTION

Embodiments of the present invention will now be described in detail with reference to the accompanying Figures.

Figure 1:
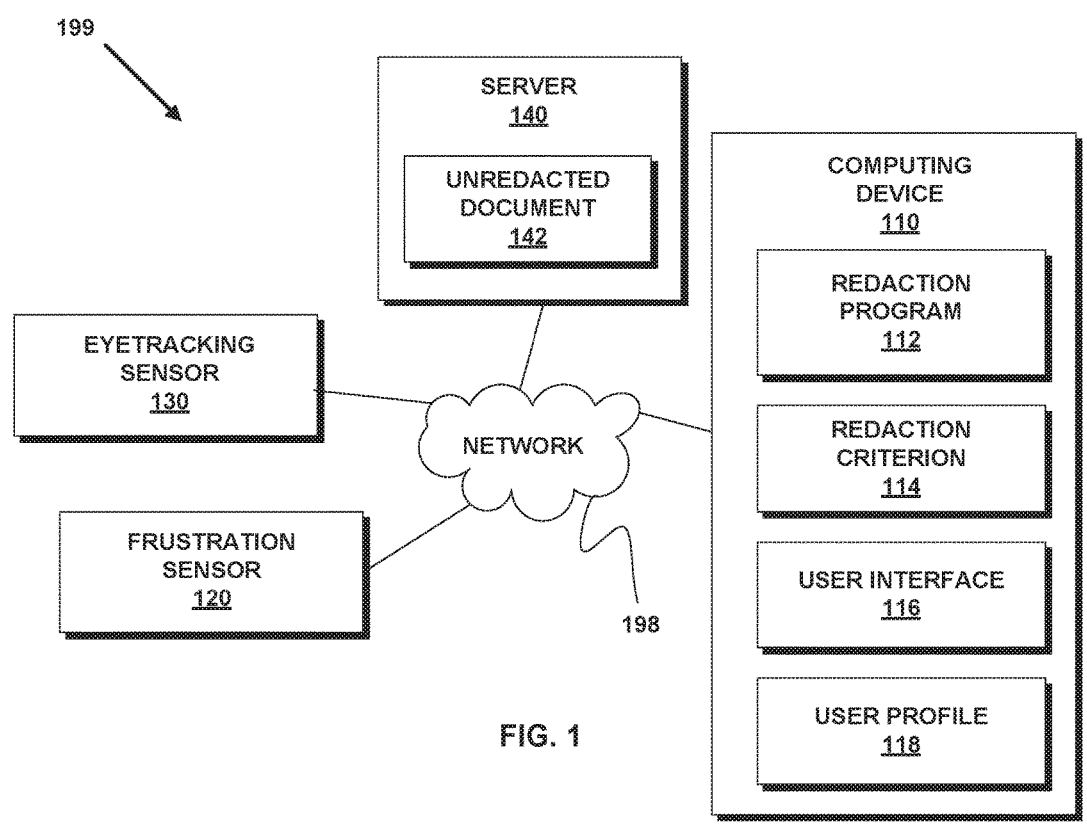
FIG. 1 illustrates an optimized redaction system, in accordance with an embodiment of the invention.

FIG. 1 illustrates optimized redaction system 199, in accordance with an embodiment of the invention. In an example embodiment, optimized redaction system 199 includes a computing device 110, a frustration sensor 120, an eye tracking sensor 130 and a server 140 interconnected via a network 198.

In the example embodiment, network 198 is the Internet, representing a worldwide collection of networks and gateways to support communications between devices connected to the Internet. Network 198 may include, for example, wired, wireless or fiber optic connections. In other embodiments, network 198 may be implemented as an intranet, a local area network (LAN), or a wide area network (WAN). In general, network 198 can be any combination of connections and protocols that will support communications between the computing device 110, the frustration sensor 120, the visual sensor 130 and the server 140.

Frustration sensor 120 may be any type of computing device having one or more environmental sensors and connected to computing device 110 via network 198. In an example embodiment, frustration sensor 120 is a computing device connected to one or more sensors that measure physical or physiological characteristics of a user, module which may be used to determine if a user's frustration has reached a threshold (e.g. that a user is frustrated) based on a deviation of their current physical or physiological state from their baseline physical or physiological state. While FIG. 1 depicts frustration sensor 120 as a separate device connected to computing device 110, the features and programs located on frustration sensor 120 may, in whole or in part, be located on computing device 110. Frustration sensor 120 is described in more detail with reference to FIG. 3.

Eye-tracking sensor 130 may be any type of computing device having one or more sensors for determining where a user's eye is pointing and connected to computing device 110 via network 198. In an example embodiment, eye-tracking sensor 130 is a computing device that contains hardware and monitoring equipment for detecting the gaze of an individual. While FIG. 1 depicts eye-tracking sensor 130 as a separate device connected to computing device 110, the features and programs located on eye-tracking sensor 130 may, in whole or in part, be located on computing device 110. Eye-tracking sensors 130 is described in more detail with reference to FIG. 3.

Server 140 includes unredacted document 142. Server 140 may be a computing device containing the hard copy of many records containing sensitive information. In an embodiment, server 140 may be a desktop computer, a notebook, a laptop computer, a tablet computer, a handheld device, a smart-phone, a thin client, or any other electronic device or computing system capable of receiving and sending data to and from other computing devices such as computing device 110 via network 198. Although not shown, optionally, server 140 can comprise a cluster of servers for storing unredacted document 142, and transmitting them to computing device 110. Server 140 is described in more detail with reference to FIG. 3.

In the example embodiment, unredacted document 142 may be a computer file containing sensitive information that may need redaction. Such documents may be patient records, legal discovery documents, transaction records, or any other type of documentation that may contain private, privileged or sensitive information.

Computing device 110 includes redaction program 112, redaction criterion 114 and user interface 116. In the example embodiment, computing device 110 is a desktop computer, a notebook or a laptop computer; however, in other embodiments, computing device 110 may be a smart phone, a tablet computer, a handheld device, a thin client, or any other electronic device or computing system capable of receiving and sending data to and from frustration sensor 120 via network 198, and capable of operating a graphical user interface. Computing device 110 is described in more detail with reference to FIG. 3.

In the example embodiment, redaction criterion 114 may contain information detailing redaction criterion for redaction program 112. For example, redaction criterion 114 may contain a hierarchy of redaction (e.g. most stringent redaction to no redaction) which is referenced by redaction program 112. Additionally, redaction criterion 114 may contain specific characteristics to identify sensitive information such as, for example, company specific unique ID format (e.g. format for employee or customer serial number), specific people's names, social security numbers or other identifying information. Additionally, redaction criterion may call for redaction of whole classes of information (e.g. monetary values).

User interface 116 includes components used to transmit information from the computing device 110 to a user. In an example embodiment, user interface 116 uses a combination of technologies and devices, such as device drivers, to provide a platform to enable users of computing device 110 to interact with redaction program 112. In the example embodiment, user interface 116 is a display or screen capable of presenting a redacted document to a user.

User profile 118 includes information pertaining to the user's characteristics and historical readings from frustration sensor 120. The historical readings from frustration sensor 120 may be specific to the user involved, or may be a generic model developed from multiple user's having similar characteristics. User characteristics may include aspects of the user such as, for example, role in a company, education level, degrees obtained, IQ, experience level, or any other types of information that may create differences in frustration level. Additionally, user profile includes setpoints or rules for determining what amount of deviation from the baseline should be classified as frustration. These setpoints may be manually entered, and adjusted, by an administrator of the system, or may be adjusted by the system based on a response from the administrator that the level of redaction for a user is too lenient (i.e. the threshold setting to determine frustration is too low, and reduces redaction level too easily).

Redaction program 112 is a software application or configuration in a software application capable of determining and redacting sensitive information from an unredacted document 142, and iterating the redaction level of portions of the document to less stringent redaction techniques based on a user's frustration level. Initial redactions of the document may be performed by completely redacting words, phrases, or information set forth in redaction criterion 114. For example, redaction program 112 may redact strings of numbers. The operations and functions of redaction program 112 are described in further detail below with regard to FIG. 2.

Additionally, redaction program 112 may contain an eye-tracking module. Eye-tracking module is a module of redaction program 112 that receives input from eye-tracking sensor 130 to determine a user's gaze. Eye-tracking module receives information from the sensors that are a part of eye-tracking sensor 130, and determines what portion of a user interface 116 a user is focused on. In one embodiment, eye-tracking module tracks a user's eye movements with one or more cameras attached to the eye-tracking sensor 130, and determines the gaze by utilizing geometric principles to triangulate the portion focused on by both retinas. In another embodiment, eye-tracking module determines a user's gaze based on sensors contained in a user's contact lenses (e.g. camera, gyroscope) and determines where a user is looking based on the visual input received, via network 198, from the contact lens, or based on movement detected by the contact lens, or both. In each embodiment, the eye-tracking module returns an area of the user interface, such as for example a specific word, sentence, picture, or place on a document that the user is observing.

Redaction program 112 may also contain a frustration module. Frustration module is a program that uses inputs from frustration sensor 120 to determine a user's level of frustration while reading a redacted document. Frustration module may use facial cues, response time, eye movement, pulse rate, or any other physical or physiological stimuli received from frustration sensor 120, and compare that to a baseline for the user. The baseline for a user may be developed through continuous, or periodic, monitoring of the user during interactions with the computing device to determine a user's physical or physiological state when resting, when reading or when performing other tasks on computing device 110. This may allow frustration module to compare a user's current state with a user's typical state for the task being performed, and determining that a user is frustrated when the difference between the user's current state and the baseline level is above a threshold amount (e.g. the user is frustrated). Additionally, generic models may be developed for the entire population of users, or specific segments of users having similar characteristics, that may create a generic frustration baseline for users with little or no history, or in instances where a user's current readings do not fit previous user histories.

Figure 2:
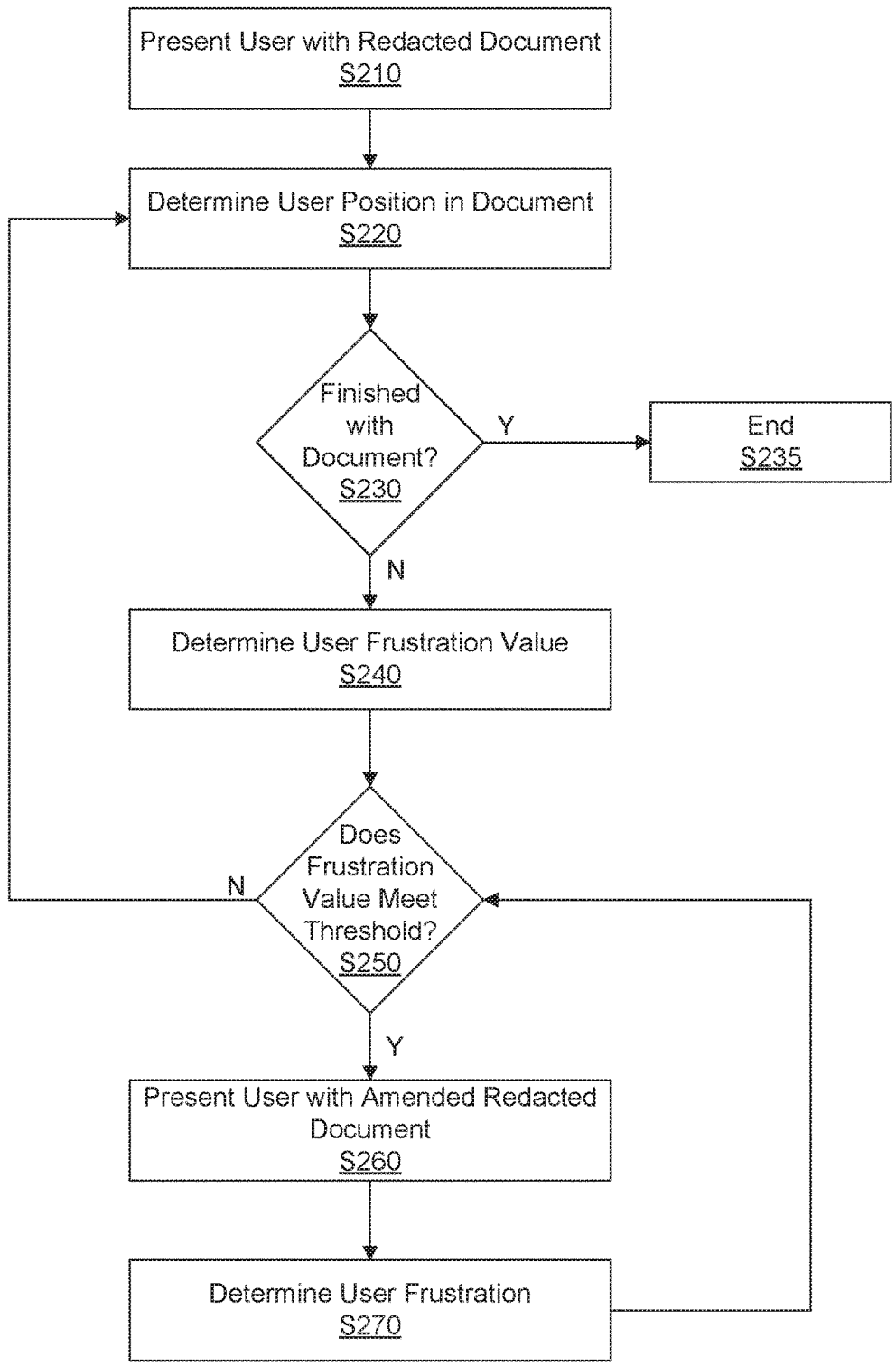
FIG. 2 is a flowchart illustrating the operations of the optimized redaction system of FIG. 1, in accordance with an embodiment of the invention.

FIG. 2 is a flow chart illustrating redaction program 112. Referring to step S210, redaction program 112 presents a user with a redacted document. Redaction program 112 receives an unredacted document 142 from server 140, and determines portions of the unredacted document that are considered to contain sensitive information based on the preferences located in redaction criterion 114. In the example embodiment, the preference detail the characters, or words/phrases, that are considered sensitive information may be determined using rules, such as, words fitting a particular format (e.g. a capitalized first letter signifies a proper noun), specific key words signifying sensitive details (e.g. Road "Name"), numbers fitting a particular format (e.g. known formats for serial numbers or social security numbers), monetary values, coordinates, or any specific information entered by an administrator that is known to be sensitive (e.g. a specific company name). The redaction program 112 then tags the portions containing sensitive information, and assigns a metadata tag to each string, signifying the type of data that is redacted (e.g. name, place, vehicle number, monetary amount). The redaction program 112 then replaces each portion containing sensitive information with the most stringent redaction method available, and records the level of redaction as metadata, based on the preferences located in redaction criterion 114. In an example embodiment, the most stringent redaction criterion available may be completely blacking out the portions containing sensitive information. In other embodiments, the most stringent method available may be scrambling the portions containing sensitive information, or another alternative means of redaction. Following the redaction of the sensitive data, the redacted document is presented to the user.

Referring to step S220, redaction program 112 determines a user's position in the redacted document. The user's position in the redacted document is received from eye-tracking module, and provides at least the paragraph, more preferably the sentence, and even more preferably the word or groups of words, the user is currently reading. This allows the redaction program 112 to determine the place in a document that a user is observing, such as the redacted portion containing sensitive information that the user is observing.

Referring to step S230, redaction program 112 determines whether a user has finished reading the document based on the determined place in the document from step S220. The redaction program 112 determines that the user has finished with the document, by receiving information from eye-tracking module sensor 130, and redaction programming 112 determining that the user's location is at the end of the document. This may be determined by the user's gaze remaining at the end of the document for a threshold amount of time, or alternatively by the user changing their gaze to another item. If the user is finished with the document, redaction program 112 proceeds to step S235. If the user has not finished the document, redaction program 112 proceeds to step S240.

Referring to step S235, following the determination that the user has finished reading the document, the redaction program 112 ends the iterative redaction technique. Redaction program may save the metadata for each redacted portion containing sensitive information, such as the level of redaction, in the user profile 118 for future access.

Referring to step S240, redaction program 112 determines a user's frustration level through continuous, or periodic, monitoring of physical characteristics of the user. Monitoring the user may include using one or more of the frustration sensors 120 and the eye-tracking sensors 130. In one example embodiment, redaction program 112 may receive input in S220 relating to the user's position in a document. The redaction program 112 may further determine, based on the input received in S220, the rate at which a user reads the document. The redaction program 112 may further compare the current reading rate to a baseline rate for the user. In an example, a user's frustration may be determined based on a change in reading rate below the baseline level. For example, redaction program 112 may measure the change in the user's gaze from the eye-tracking module, against a timing mechanism, to determine the rate at which the user is progressing through the document. In additional examples, the redaction program 112 may relate the user's gaze to the words that are within that gaze, and determine the user's reading in words per minute, based on the number of words the user's gaze is going across during a set interval (e.g. 15 seconds).

Additionally, redaction program 112 may compare current physiological data from frustration sensor 120 with a physiological baseline to determine a user's frustration level based on the physiological difference between the current state of the user and the baseline for the user. Physiological data may be pulse, blood pressure, perspiration, facial expressions, brain activity (e.g. ECG and FMRI), or any other physiological parameters which could be measured. Additionally, general baselines may be created using information from all of the users, or multiple users having similar characteristics. The general baseline may used in instances where an individual's personal model may not be accurate (e.g. new user, change in user circumstances). Additionally, a user's baseline may be modified by based on population trends, creating hybrid baselines, combining a general model and a user's history, and may be used in determining a user's frustration level. In yet another example, redaction program 112 may take a combination of data from the eye-tracking sensor 130 and frustration sensor 120, and determine a user's frustration based on the deviation of the multiple factors from the baseline.

Additionally, redaction program 112 may create a baseline for a user based on physiological data, or reading rate detected, during a user's reading of the redacted information. The collection of all of this information may be used to create a user baseline, wherein the baseline represents the user's physiological characteristics during a period of routine frustration. In one example, redaction program 112 may create a baseline profile of all of the user's reading rate, and the determination of frustration may occur when a user's reading rate drops below a certain percentile (e.g. below $20^{th}$ percentile) based on setpoints laid out in the user profile 118. In another example, redaction program 112 may determine a baseline reading rate of a user based on typical performance (e.g. between $25^{th}$ and $75^{th}$ percentile) and determine frustration when a user's current reading rate abnormally deviates from the baseline rate, as defined in the user profile 118. In yet another example, a user may be monitored while reading documents containing no sensitive information (i.e. a document with no redactions) to determine the baseline parameters of the user. In instances where there is not enough information to form a baseline for an individual user, a generic baseline for other users possessing similar characteristics may be used.

Referring to step S250, redaction program 112 determines if a user's frustration level meets a threshold value. The threshold value may be categorized as the difference between a user's baseline state and the user's current state being above a value indicative of a user being frustrated. The threshold value may be contained in with other user characteristics in redaction criterion 114. If the threshold value is not met, redaction program 112 proceeds to step S220. If the threshold value is met, redaction program 112 proceeds to step S260.

Referring to step S260, redaction program 112 amends the redacted document, and presents the user with the newly redacted document. Redaction program 112 uses the user position determined in step S220, and changes the type of redaction in the determined position to the next most stringent redaction type. The next most stringent redaction type is based on the order of redaction types, located in redaction criterion 114. In an additional embodiment, the redaction program 112 may apply the next most stringent redaction type to all portions containing sensitive information having the same, or sufficiently similar, metadata tags (e.g. redaction would change for all serial numbers). The redaction program 112 then displays the amended redacted document.

Referring to step S270, redaction program 112 determines a user's frustration level through continuous, or periodic, monitoring of physical characteristics of the user. Monitoring the user may include using one or more of the frustration sensors 120 and the eye-tracking sensors 130. In one example embodiment, redaction program 112 may receive input in S220 relating to the user's position in a document. The redaction program 112 may further determine, based on the input received in step S220, the rate at which a user reads the document. The redaction program 112 may further compare the current reading rate to a baseline rate for the user. In an example, a user's frustration may be determined based on a change in reading rate below the baseline level. For example, redaction program 112 may measure the change in the user's gaze from the eye-tracking module, against a timing mechanism, to determine the rate at which the user is progressing through the document. In additional examples, the redaction program 112 may relate the user's gaze to the words that are within that gaze, and determine the user's reading in words per minute, based on the number of words the user's gaze is going across during a set interval (e.g. 15 seconds).

Additionally, redaction program 112 may compare current physiological data from frustration sensor 120 with a physiological baseline to determine a user's frustration level based on the physiological difference between the current state of the user and the baseline for the user. Physiological data may be pulse, perspiration, facial expressions, brain activity (e.g. ECG and FMRI), or any other physiological parameters which could be measured. Additionally, general baselines may be created using information from all of the users, or multiple users having similar characteristics. The general baseline may used in instances where an individual's personal model may not be accurate (e.g. new user, change in user circumstances). Additionally, a user's baseline may be modified by based on population trends, creating hybrid baselines, combining a general model and a user's history, and may be used in determining a user's frustration level. In yet another example, redaction program 112 may take a combination of data from the eye-tracking sensor 130 and frustration sensor 120, and determine a user's frustration based on the deviation of the multiple factors from the baseline.

Additionally, redaction program 112 may create a baseline for a user based on physiological data, or reading rate detected, during a user's reading of the redacted information. The collection of all of this information may be used to create a user baseline, wherein the baseline represents the user's physiological characteristics during a period of routine frustration. In one example, redaction program 112 may create a baseline profile of all of the user's reading rate, and the determination of frustration may occur when a user's reading rate drops below a certain percentile (e.g. below $20^{th}$ percentile) based on setpoints laid out in the user profile 118. In another example, redaction program 112 may determine a baseline reading rate of a user based on typical performance (e.g. between $25^{th}$ and $75^{th}$ percentile) and determine frustration when a user's current reading rate abnormally deviates from the baseline rate, as defined in the user profile 118. In yet another example, a user may be monitored while reading documents containing no sensitive information (i.e. a document with no redactions) to determine the baseline parameters of the user. In instances where there is not enough information to form a baseline for an individual user, a generic baseline for other users possessing similar characteristics may be used.

In an example illustration of the above method, redaction program 112 may receive an unredacted document containing the following sentence: "The Car 57-7777-34 drove in 120 km in Road 6 until it hit Car 45-534-76 right in the front and the driver of Car 45-534-76 was injured in the head." During step S210, redaction program may determine that the serial numbers 57-7777-34 and 45-534-76 are sensitive by matching the format of the numbering to a numbering format that is known to contain sensitive information (i.e. serial numbers). The redaction program 112 may also determine that "120", "Road 6", "front" and "head" could be sensitive information based on the trigger words that would cue their sensitivity. Thus, redaction program 112 may replace the sensitive terms, and display a redacted document containing "The Car ** drove in * km in ** until it hit Car  right in the * and the driver of Car *** was injured in the **."

During step S220, redaction program 112 may determine that a user is viewing the portion of the sentence containing "Car**." In step S230, the redaction program determines that the user is not finished reading the document (e.g. user is not at the end). In step S240, in the example illustration, the redaction program 112 determines the frustration level of the user. During step S250 the redaction program 112 determines the user, who in this example is an accident analyst, has exceeded the frustration threshold, because the user's reading rate has decreased, and the gaze of the user is fixed on the above sentence. Additionally, redaction program 112 determines the user's heart rate went up. During step S260, the redaction program 112 applies the next most stringent redaction criterion (i.e. replacing identifiable numbers with unique placeholders), and displays the following sentence: "The Car A drove in * km in ** until it hit Car B right in the * and the driver of Car A was injured in the ****." During stage S270, the redaction program 112 determines the user's current frustration level, and in step S240 determines that their current frustration is no longer above the frustration level. Redaction program 112 continues with a similar type of analysis for each portion of the redacted document, until the user is finished reading.

Figure 3:
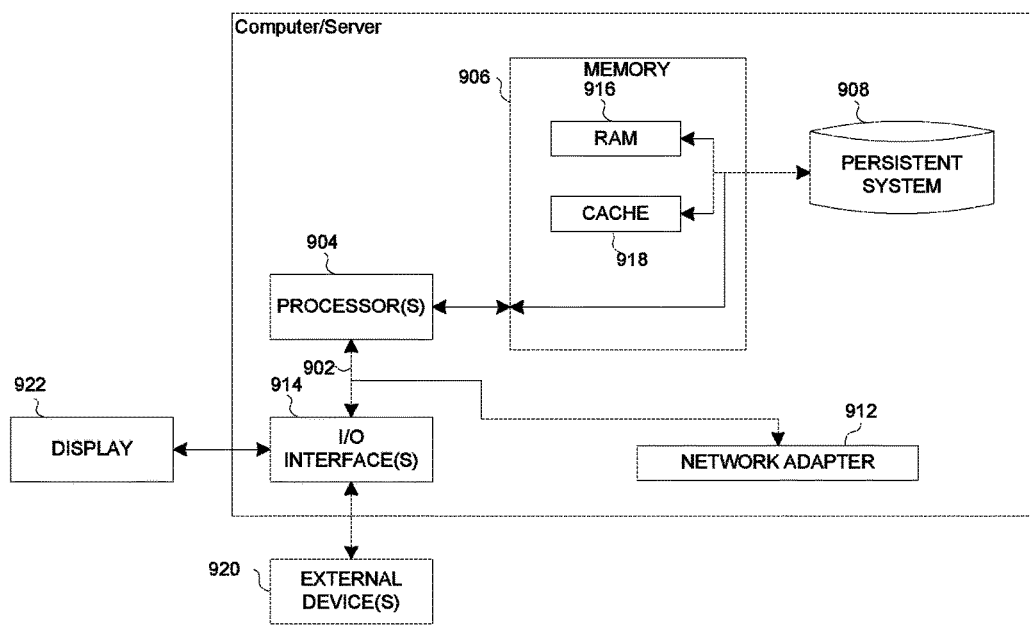
FIG. 3 is a block diagram depicting the hardware components of the optimized redaction system of FIG. 3, in accordance with an embodiment of the invention.

FIG. 3 depicts a block diagram of components of computing device 110, frustration sensor 120, eye-tracking sensor 130 and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110, frustration sensor 120, eye-tracking sensor 130 and server 140 include communications fabric 902, which provides communications between computer processor(s) 904, memory 906, persistent storage 908, communications unit 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs delay module, redaction program 112, redaction criterion 114, and user interface 116, in computing device 110; and unredacted document 142 in server 140 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Communications unit 912, in these examples, provides for communications with other data processing systems or devices. In these examples, communications unit 912 includes one or more network interface cards. Communications unit 912 may provide communications through the use of either or both physical and wireless communications links. The programs redaction program 112, redaction criterion 114, and user interface 116, in computing device 110; and unredacted document 142 in server 140 may be downloaded to persistent storage 908 through communications unit 912.

I/O interface(s) 914 allows for input and output of data with other devices that may be connected to computing device 110, frustration sensor 120, eye-tracking sensor 130 and server 140. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., The programs delay redaction program 112, redaction criterion 114, and user interface 116, in computing device 110; and unredacted document 142 in server 140, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for redacting a document, the method comprising:
receiving an unredacted document;
determining one or more portions of the unredacted document contains sensitive information, wherein determining one or more portions of the unredacted document contains sensitive information comprises determining that a pattern for the one or more portions of the unredacted document matches a pattern corresponding to sensitive information;
applying a redaction method to the one or more portions of the unredacted document containing sensitive information to create a redacted document, wherein the redaction method replaces the one or more portions of the unredacted document containing sensitive information with one or more different pieces of content; and wherein the one or more different pieces of content correlate to a most stringent redaction method selected from a list of redaction methods;
displaying the redacted document to a user;
determining a frustration level of the user, wherein determining the frustration level of the user comprises:
receiving current physiological information pertaining to the user;
receiving historical physiological information pertaining to the user; and
determining if there is a difference between the received current physiological information pertaining to the user and the received historical physiological information pertaining to the user;
based on determining that the frustration level of the user is above a threshold value, replacing at least one of the one or more different pieces of content with a one or more pieces of content corresponding to a next most stringent redaction method from the list of redaction methods; and
displaying the updated redacted document to the user.

2. The method of claim 1, wherein the physiological information comprises one or more of pulse, blood pressure, facial expressions, brain activity and reading rate.

3. The method of claim 1, further comprising determining a position of the user in the redacted document, wherein the position of the user comprises a portion of the one or more portions that the user is currently viewing.

4. The method of claim 3, further comprising replacing the portion of the one or more portions the viewer is currently viewing with the content corresponding to the next most stringent redaction method from the list of redaction methods.

5. The method of claim 3, wherein determining the position of the user in the redacted document comprises tracking the eyes of the user to determine what portion of the document the user is viewing.

6. A computer program product for redacting a document, the computer program product comprising:
one or more computer-readable storage devices and program instructions stored on at least one of the one or more tangible storage devices, the program instructions comprising:
program instructions to receive an unredacted document;
program instructions to determine one or more portions of the unredacted document contains sensitive information, wherein the program instructions to determine one or more portions of the unredacted document contains sensitive information comprises program instructions to determine that a pattern for the one or more portions of the unredacted document matches a pattern corresponding to sensitive information;
program instructions to apply a redaction method to the one or more portions of the unredacted document containing sensitive information to create a redacted document, wherein the redaction method replaces the one or more portions of the unredacted document containing sensitive information with one or more different pieces of content; and wherein the one or more different pieces of content correlate to a most stringent redaction method selected from a list of redaction methods;

program instructions to display the redacted document to a user;

program instructions to determine a frustration level of the user, wherein the program instructions to determine the frustration level of the user comprises:
 program instructions to receive current physiological information pertaining to the user;
 program instructions to receive historical physiological information pertaining to the user; and
 program instructions to determine if there is a difference between the received current physiological information pertaining to the user and the received historical physiological information pertaining to the user;

based on determining that the frustration level of the user is above a threshold value, program instructions to replace at least one of the one or more different pieces of content with a one or more pieces of content corresponding to a next most stringent redaction method from the list of redaction methods; and program instructions to display the updated redacted document to the user.

7. The computer program product of claim 6, wherein the physiological information comprises one or more of pulse, blood pressure, facial expressions, brain activity and reading rate.

8. The computer program product of claim 6, further comprising program instructions to determine a position of the user in the redacted document, wherein the position of the user comprises a portion of the one or more portions that the user is currently viewing.

9. The computer program product of claim 8, further comprising program instructions to replace the portion of the one or more portions the viewer is currently viewing with the content corresponding to the next most stringent redaction method from the list of redaction methods.

10. The computer program product of claim 8, wherein the program instructions to determine the position of the user in the redacted document comprise program instructions to track the eyes of the user to determine what portion of the document the user is viewing.

11. A computer system for redacting a document, the computer system comprising:
 one or more processors, one or more computer-readable memories, one or more computer-readable tangible storage devices, and program instructions stored on at least one of the one or more storage devices for execution by at least one of the one or more processors via at least one of the one or more memories, the program instructions comprising:
  program instructions to receive an unredacted document;
  program instructions to determine one or more portions of the unredacted document contains sensitive information, wherein the program instructions to determine one or more portions of the unredacted document contains sensitive information comprises program instructions to determine that a pattern for the one or more portions of the unredacted document matches a pattern corresponding to sensitive information;
  program instructions to apply a redaction method to the one or more portions of the unredacted document containing sensitive information to create a redacted document, wherein the redaction method replaces the one or more portions of the unredacted document containing sensitive information with one or more different pieces of content; and wherein the one or more different pieces of content correlate to a most stringent redaction method selected from a list of redaction methods;
  program instructions to display the redacted document to a user;
  program instructions to determine a frustration level of the user, wherein the program instructions to determine the frustration level of the user comprises:
   program instructions to receive current physiological information pertaining to the user;
   program instructions to receive historical physiological information pertaining to the user; and
   program instructions to determine if there is a difference between the received current physiological information pertaining to the user and the received historical physiological information pertaining to the user;
  based on determining that the frustration level of the user is above a threshold value, program instructions to replace at least one of the one or more different pieces of content with a one or more pieces of content corresponding to a next most stringent redaction method from the list of redaction methods; and
  program instructions to display the updated redacted document to the user.

12. The computer system of claim 11, wherein the physiological information comprises one or more of pulse, blood pressure, facial expressions, brain activity and reading rate.

13. The computer system of claim 11, further comprising program instructions to determine a position of the user in the redacted document, wherein the position of the user comprises a portion of the one or more portions that the user is currently viewing.

14. The computer system of claim 13, further comprising program instructions to replace the portion of the one or more portions the viewer is currently viewing with the content corresponding to the next most stringent redaction method from the list of redaction methods.

* * * * *